US006741910B1

(12) United States Patent
Yamazaki

(10) Patent No.: US 6,741,910 B1
(45) Date of Patent: May 25, 2004

(54) CONTROL DEVICE FOR AUTOMATIC VENDING MACHINE

(75) Inventor: Yasuhiro Yamazaki, Gunma-ken (JP)

(73) Assignee: Fuji Electric Co., Ltd., Kanagawa (JP)

(*) Notice: Subject to any disclaimer, the term of this patent is extended or adjusted under 35 U.S.C. 154(b) by 35 days.

(21) Appl. No.: 09/809,430

(22) Filed: Mar. 16, 2001

(51) Int. Cl.[7] .............................................. G06F 17/00

(52) U.S. Cl. ........................ 700/241; 700/244; 700/237

(58) Field of Search ................................ 700/244, 241, 700/237

(56) References Cited

U.S. PATENT DOCUMENTS

| | | | | | |
|---|---|---|---|---|---|
| 4,725,977 | A | * | 2/1988 | Izumi et al. | 364/900 |
| 4,771,461 | A | | 9/1988 | Matyas | |
| 4,787,050 | A | * | 11/1988 | Suzuki | 364/479 |
| 4,935,870 | A | | 6/1990 | Burk, Jr. et al. | |
| 5,548,761 | A | | 8/1996 | Balasundaram et al. | |
| 5,600,800 | A | * | 2/1997 | Kikanis et al. | 395/281 |
| 5,959,869 | A | * | 9/1999 | Miller et al. | 364/479.01 |
| 5,963,452 | A | * | 10/1999 | Etoh et al. | 364/479.06 |
| 6,113,652 | A | | 9/2000 | Lysik et al. | |
| 6,308,111 | B1 | * | 10/2001 | Koga | 700/236 |
| 6,314,565 | B1 | * | 11/2001 | Kenner et al. | 717/11 |
| 6,498,965 | B2 | * | 12/2002 | Matsumoto et al. | 700/231 |
| 2001/0012975 | A1 | * | 8/2001 | Matsumoto | 700/231 |

FOREIGN PATENT DOCUMENTS

| | | | | | |
|---|---|---|---|---|---|
| GB | 2172720 | A | * | 9/1986 | G06F/15/40 |
| GB | 2310945 | A | * | 9/1997 | G07F/9/08 |
| JP | 11045367 | | | 2/1999 | |
| JP | 2000163636 | | | 6/2000 | |
| JP | 2001-163636 | A | * | 6/2000 | G07F/9/00 |
| JP | 2000293743 | | | 10/2000 | |
| JP | 2000322636 | | | 11/2000 | |
| JP | 2001-34822 | A | * | 2/2001 | G07F/9/00 |
| JP | 2001-126124 | A | * | 5/2001 | G07F/9/00 |

* cited by examiner

*Primary Examiner*—Donald P. Walsh
*Assistant Examiner*—Michael E. Butler
(74) *Attorney, Agent, or Firm*—McDermott, Will & Emery

(57) ABSTRACT

According to a control device for automatic vending machine of the invention, a manufacturer discriminating code and a version of control program corresponding to the manufacturing discriminating code are stored in each of terminal control units 2, 3, 4, 5 in advance, and are communicated to a main control unit 1 in first communicating operation after the terminal control unit is exchanged or newly installed. Based on the manufacturing discriminating code and the version of control program, the main control unit 1 inspects a memory 1A installed in the main control unit, a memory card 7 inserted in an expanding slot 6, and a management computer 10 which is capable of communication, in this order, and obtains suitable control programs from them. Where the terminal control unit is exchanged or newly installed, the control program of the main control unit is automatically renewed to reduce time and operation which have been much spent in conventional renewal and to protect operation error therefor.

4 Claims, 2 Drawing Sheets

CONTROL DEVICE FOR AUTOMATIC VENDING MACHINE

FIELD OF THE INVENTION

The present invention relates to a control device for automatic vending machine comprising terminal control units, each of which controls each unit of automatic vending machine separately, and a main control unit which communicates with the terminal control units and controls them collectively.

BACKGROUND OF THE INVENTION

In a conventional control device for automatic vending machine, each unit of the automatic vending machine such as a sales control unit which controls a sales product sending mechanism, a coin treating control unit which controls a coin treating mechanism to discriminate a sort of coin, or a display control unit which controls a display of a price display device is separately controlled by each terminal control unit. And, a main control unit controls the terminal control units collectively while it communicates with them through a signal line.

Each of the terminal control units has a control program respectively and carries out predetermined controls. The main control unit has a control program to control each terminal control unit collectively and carries out predetermined control. The control program of the main control unit has a control program corresponding to each of the terminal control unit. Accordingly, if one of the terminal control units is replaced by a new type terminal control unit or if a new type terminal control unit is added, then the control program of the main control unit has to be renewed each time.

As a result, in case that the terminal control unit is replaced or is newly installed in the main control unit of automatic vending machine, a ROM in which a control program is written is replaced by a new ROM or an old program stored in a memory is rewritten to a new program by manual operation each time.

However, there is a problem in conventional control device of automatic vending machine that additional operation is necessary for replacement of the ROM or for rewriting of the memory, where the terminal control unit is replaced or is newly installed. Further, there is another problem that operation error occurs, because such additional operation is carried out by manual operation.

SUMMARY OF THE INVENTION

Therefore, it is an object of the invention to solve the problems and to provide a control device of automatic vending machine in which a control program in a main control unit is automatically renewable in case that a terminal control unit is replaced or installed by new one, whereby time and labor for the operation can be reduced and operation errors can be prevented.

The above object of the invention can be attained by a control device for automatic vending machine comprising a plural terminal control units, each of which controls each unit of the automatic vending machine separately, and a main control unit which communicates with the terminal control units and controls them collectively, each of said terminal control unit having an identification code of each manufacturer and a version of control program corresponding thereto, and sending the identification code and the version to the main control unit in initial communication with the main control unit, and the main control unit receiving, based on the identification code of each manufacturer and the version of control program which are received from each of the terminal control unit, the control program corresponding to each terminal control unit connected thereto. According to the first embodiment of the invention, the control program in the main control unit is automatically renewable in case that the terminal control unit is replaced or installed by new one, whereby time and labor for the operation can be reduced and operation error can be prevented.

According to a second embodiment of the invention, the above object can be attained by a control device of automatic vending machine comprising the main control unit inspecting, based on the identification code of each manufacturer and the version of control program which are received from each of the terminal control unit, a ROM installed in the main control unit, a memory card put in an expanding slot, and an inner portion of external memory medium which can communicate in turn, and receiving a suitable control program from one of them. According to the second embodiment of the invention, the main control unit is interlocked with the terminal control unit connected thereto to find the control program thereof automatically and to rewrite it automatically.

According to a third embodiment of the invention, the above object can be attained by a control device of automatic vending machine comprising a main control unit and a program storing unit, said main control unit determining a program area for separate functions and an expanding program area and rewriting a control program partially per the area unit. According to the third embodiment of the invention, rewriting operations are carried out effectively, because an amount of data to be rewritten is less.

According to a fourth embodiment of the invention, the above object can be attained by a control device of automatic vending machine comprising a main control unit and a terminal control unit, said terminal control unit storing a control program of the main control unit to control the terminal control unit, and said main control unit receiving the control program from the terminal control unit in case that the terminal control unit is installed. According to the fourth embodiment of the invention, control or management of the computers becomes easier, because it is not necessary to keep corresponding programs in a memory or memory card of the main control unit or in a management computer.

DESCRIPTION OF THE PREFERRED EMBODIMENT

Preferred embodiments of the present invention are described in detail hereinafter with reference to the accompanying drawings.

Figure 1:
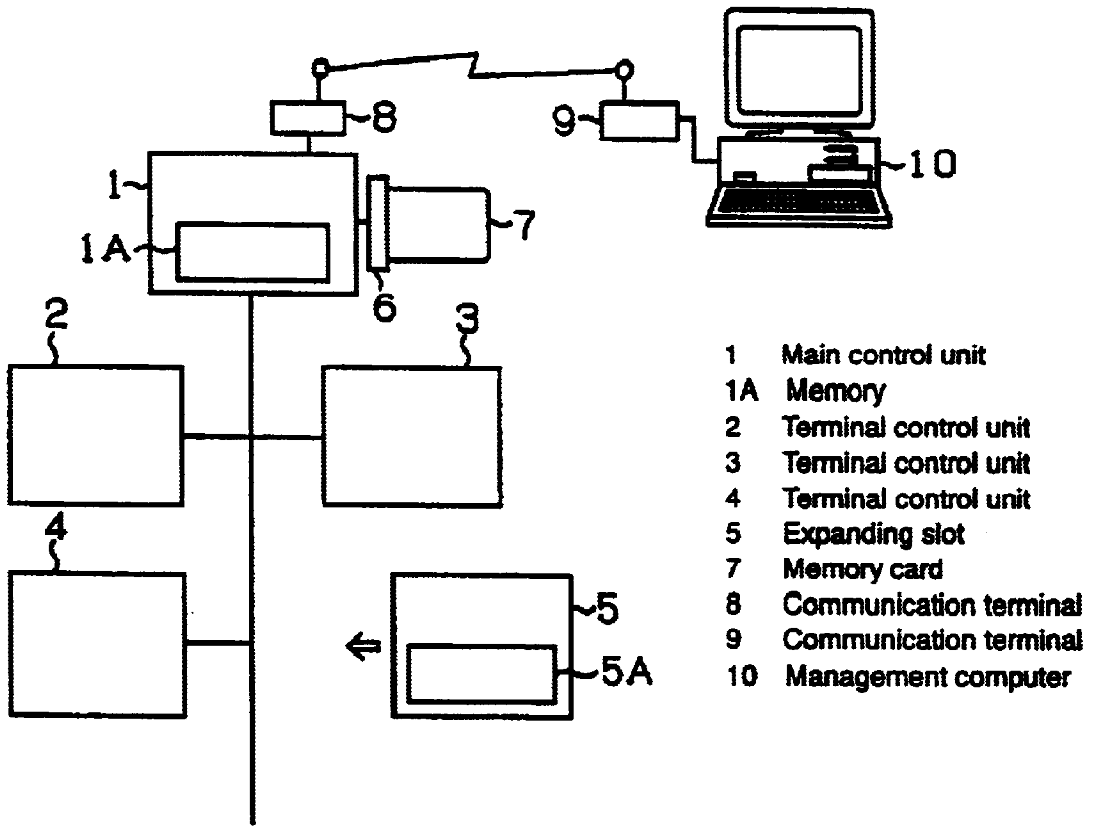
FIG. 1 is a schematic drawing to illustrate a system of control device for automatic vending machine of the invention.

FIG. 1 is a schematic drawing to illustrate a system of control device for automatic vending machine of the invention. A main control unit 1 communicates with terminal control units 2, 3, 4 such as a sales control unit, a coin treating unit or display control unit, and controls them collectively.

Each terminal control unit 2, 3, 4 has a control program to control a sales product sending mechanism, a coin treating mechanism or a price display device by which a predetermined control is implemented. And, the main control unit 1 has a control program to control the terminal control units 2, 3, 4 collectively by which a predetermined collective control is implemented. Since the main control unit 1 communicates with each terminal control unit 2, 3, 4 by the control program and controls them, contents of the control program are different by manufacturers and types of the terminal control units.

Accordingly, in case that each of the terminal control units is replaced by new one or a new terminal control unit is installed to the terminal control units, the control program of the main control unit has to be rewritten in accordance with the replacement or installation.

The control program of the main control unit 1 is stored in a memory 1A including a EPROM, a flash memory, etc. On the assumption what a kind of terminal control units is incorporated for control operation, a plural of control programs corresponding to a combination of the terminal control units are stored in the memory 1A, in advance. In the control operation, the control program suitable for the terminal control unit which is incorporated in the automatic vending machine is selected from the plural of control programs. When the terminal control units 2, 3, 4 which have been used are replaced by new one or a new terminal control unit 5 is incorporated in the control device of the automatic vending machine to expand functions thereof, the control program is replaced by a control program which is inspected and is suitable for a new combination of the terminal control units. After that, the inspected control program is used for operation.

A manufacturer discriminating code and a version of the control programs corresponding to the manufacturer discriminating code are stored in a non-volatile memory installed in each of the terminal control units 2 to 5. In addition, the manufacturer discriminating code and version of the corresponding terminal control unit are recorded in each control program stored in the memory 1A of the main control unit 1, whereby the control program is discriminated.

The manufacturer discriminating code and the version of the control program are transmitted from each terminal control unit to the main control unit 1, immediately after the electric source is turned on after the terminal control unit is changed. In this case, it is possible that the main control unit 1 requests the communication of the manufacturer discriminating code and the version of the control program and then, each of the terminal control units communicate them to the main control unit 1.

In any case, the main control unit 1 inspects the control program suitable for a combination of the manufacturer discriminating code and version of the control program which are received from each of the terminal control units, and the control program controls the terminal control unit after that.

In case that a new type of terminal control unit of which installation is not assumed is installed as the terminal control unit 5 to expand functions and the control program suitable for the terminal control unit to be newly installed is not stored in the memory 1A, a memory card 7 in which control programs including the control program newly installed for the terminal control unit are stored is inserted in the expanding slot 6 installed in the main control unit 1 to input the suitable control program from the memory card 7. The manufacturer discriminating code and the version are also recorded in the control program stored in the memory card 7.

Also, a communication terminal 8 can be installed in the main control unit 1 to input the suitable control program from a management computer 10 through a communication terminal 9 existing in a control center. In this case, the communication can be carried out through a public telephone line or by wireless. In case that the terminal control unit is newly connected, the main control unit can automatically change a source of receiving the control program, for example, by inspecting presence or absence of suitable control program in the memory 1A at first time, and if it is absent, by inspecting it in the memory card 7, and if it is also absent, then by getting it from the management computer 10 through the communication terminals 8, 9. Thus, at the same time when the terminal control unit is connected to the main control unit, a suitable control program can be automatically inspected and input, whereby operation error can be avoided for rewriting the program.

Figure 2:
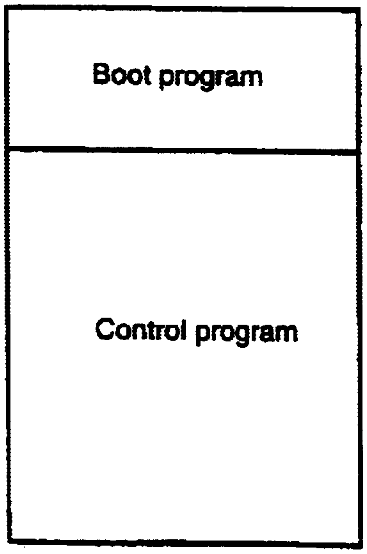
FIG. 2 is a drawing to show a storing state of control program in a memory.

Further, the control program can be rewritten wholly or in part. In case that it is wholly rewritten, whole areas to store the control program other than the area to store a boot program to rewrite a program by inspecting the manufacturer discriminating code and the version as described above can be rewritten as shown in FIG. 2.

Figure 3:
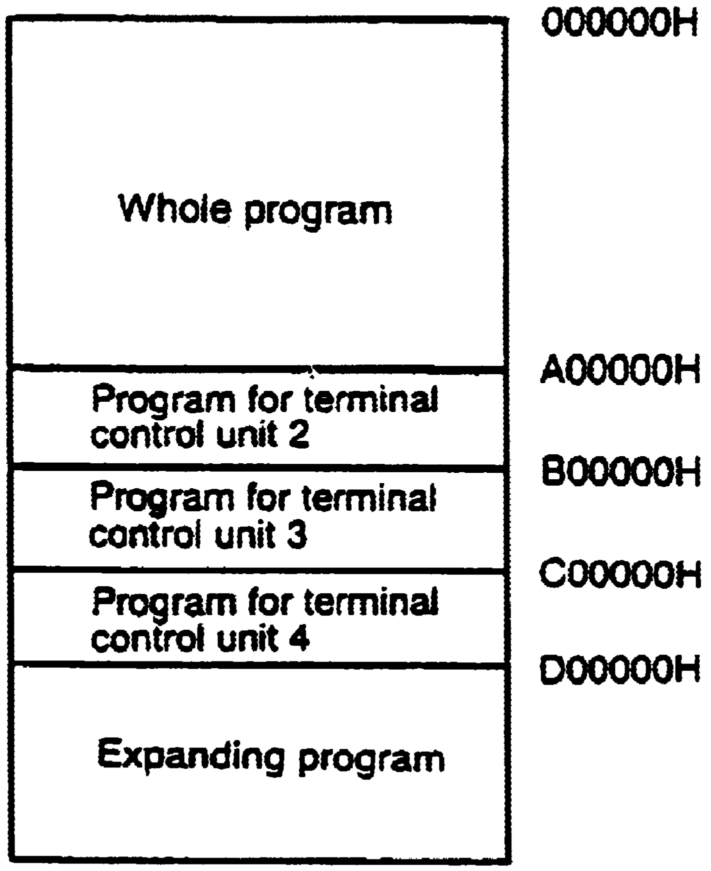
FIG. 3 is a drawing to show a storing state of control program in a memory in case that the control program is partially changed.

On the other hand, in case that the control programs corresponding to those in the terminal control units replaced or newly installed are rewritten in part, the program storing section of the memory is divided into a program area for separate functions and an expanding program, in advance. Namely, as shown in FIG. 3, areas in which the boot program and the whole program containing portions to carry out whole processing in the control program are stored, areas in which program to control the terminal control units is stored, and areas in which an expanding program to control a new terminal control unit is stored are provided, in advance, and the control programs are partially replaced in every areas.

For example, where the terminal control unit 2 is replaced by new one, whole areas storing the control program for the terminal control unit 2 are replaced by a new program. Also, where a new terminal control unit to expand functions is newly installed, the control program of newly installed terminal control unit is written in the expanding program areas.

A branch instruction goes from the whole program to the control program in each of the terminal control units to implement the whole control. At the time, because there is such the case that the expanding program does not exist, a branch decision means such as control table to indicate whether the order is branched or not is provided.

And, the control program of the main control unit for terminal control unit to be newly installed is stored in the terminal control unit in advance, the control program stored in the terminal control unit can be communicated to the main control unit. According to the way, it is not necessary to accumulate any programs corresponding to the memory 1A in the main control unit 1, the memory card 7 and the management computer 10. As a result, it is easier to manage the programs.

In the above embodiments, the control program of the main control unit 1 is stored in the memory 1A including a EPROM or a flash memory, and the operation thereof is carried out in the state. The operation can be carried out after the control program is tentatively stored in a flash memory as second memory device and then is transmitted to a SRAM or DRAM. Thus, the operation speed is improved and a storing address of the control program corresponding to each terminal control unit can be widely decided.

According to the control device for automatic vending machine of the invention which has the construction as described above, the following advantages are obtained.

According to the control device for automatic vending machine in the first embodiment of the invention, each of the terminal control unit has the identification code of each manufacturer and the version of control program corresponding thereto, and the main control unit receives, based on the identification code of each manufacturer and the version of control program which are received from each of the terminal control unit, the control program corresponding to each terminal control unit connected thereto. As a result, the control program in the main control unit is automatically renewable in case that the terminal control unit is replaced or installed by new one, whereby time and labor for the operation can be reduced and operation error can be prevented.

According to the control device for automatic vending machine in the second embodiment of the invention, the main control unit inspects, based on the identification code of each manufacturer and the version of control program, the ROM installed in the main control unit, the memory card pun in the expanding slot, and an inner portion of external memory medium capable of communicating, in turn, and receives suitable control program from one of them. As a result, the main control unit is interlocked with the terminal control unit connected thereto to find the control program thereof automatically and to rewrite it automatically.

According to the control device for automatic vending machine in the third embodiment of the invention, the main control unit determines the program area for separate functions and the expanding program area in the program storing section of the main control unit and rewrites the control program partially per the area unit. As a result, rewriting operations are carried out effectively, because the amount of data to be rewritten is less.

According to the control device for automatic vending machine in the fourth embodiment of the invention, the control program of the main control unit is stored in the terminal control unit to control the terminal control unit, and the main control unit receives the control program from the terminal control unit in case that the terminal control unit is installed. As a result, the control or management of the computers becomes easier, because it is not necessary to keep corresponding programs in the memory of the main control unit and in the memory card or management computer to be controlled.

What is claimed is:

1. A control device of an automatic vending machine having plural terminal control units, each of which controls each unit of the automatic vending machine separately, and a main control unit which communicates with each of the terminal control units and controls them collectively, each of said terminal control units having a discriminating code of each manufacturer and a version of control program corresponding to each of said terminal control units, and sending the code and the version to the main control unit in first communication with the main control unit, and the main control unit configured for inspecting at least one of an internal memory medium or an external thereof medium to obtain the control program corresponding to each of the terminal control units connected thereto based on the manufacturer discriminating code and the version of control program which are received from each of the terminal control units.

2. The control device of automatic vending machine according to claim 1, wherein said main control unit inspects, based on the manufacturer discriminating code and the version of control program, a ROM installed in the main control unit, a memory card inserted in an expanding slot, and an inner portion of external memory medium which is capable of communication in the order, and receives a suitable control program from one of said ROM, said memory card, and said external memory medium.

3. The control device of automatic vending machine according to claim 1, wherein the main control unit has a program storing section in which a program area for separate functions and an expanding program area are provided, and a control program is partially rewritten per the area.

4. The control device of automatic vending machine according to claim 1, wherein said control program of the main control unit to control the terminal control units is stored in the terminal control unit, and when the terminal control unit is installed, the main control unit receives the control program from the terminal control units.

* * * * *